US006635191B2

United States Patent
Figueroa et al.

(10) Patent No.: US 6,635,191 B2
(45) Date of Patent: Oct. 21, 2003

(54) SUPPORTED NICKEL-MAGNESIUM OXIDE CATALYSTS AND PROCESSES FOR THE PRODUCTION OF SYNGAS

(75) Inventors: Juan C. Figueroa, Wilmington, DE (US); Anne M. Gaffney, West Chester, PA (US); Ronald H. Mattson, Sr., Wilmington, DE (US); Donald B. Pierce, Salem, NJ (US); Robert A. Oswald, Milton, DE (US); Roger Song, Wilmington, DE (US)

(73) Assignee: ConocoPhillips Company, Houston, TX (US)

( * ) Notice: Subject to any disclaimer, the term of this patent is extended or adjusted under 35 U.S.C. 154(b) by 290 days.

(21) Appl. No.: 09/881,298

(22) Filed: Jun. 13, 2001

(65) Prior Publication Data

US 2002/0035036 A1 Mar. 21, 2002

Related U.S. Application Data

(60) Provisional application No. 60/211,077, filed on Jun. 13, 2000.

(51) Int. Cl.$^7$ .................... C01L 3/00; C10B 31/18; C10B 3/26; B01J 23/46; B01J 23/58
(52) U.S. Cl. .................... 252/373; 423/418.2; 423/651; 502/326; 502/328
(58) Field of Search .............. 252/373; 423/418.2; 423/651; 502/326, 328

(56) References Cited

U.S. PATENT DOCUMENTS

| | | | | |
|---|---|---|---|---|
| 4,087,259 A | * | 5/1978 | Fujitani et al. ............... 48/212 |
| 4,440,874 A | * | 4/1984 | Thompson ................... 502/327 |
| 4,877,550 A | | 10/1989 | Goetsch et al. .............. 252/373 |
| 5,149,464 A | | 9/1992 | Green et al. ................. 252/373 |
| 5,338,488 A | | 8/1994 | Choudhary et al. ......... 252/373 |
| 5,411,927 A | * | 5/1995 | Choudhary et al. ......... 502/302 |
| 5,427,993 A | * | 6/1995 | Perry et al. .................. 502/328 |
| 5,431,855 A | * | 7/1995 | Green et al. ................. 252/373 |
| 5,439,861 A | * | 8/1995 | Bhattacharyya et al. ...... 502/84 |
| 5,510,056 A | | 4/1996 | Jacobs et al. ................ 252/373 |
| 5,648,582 A | | 7/1997 | Schmidt et al. ............. 585/622 |
| 5,654,491 A | | 8/1997 | Goetsch et al. ............ 568/469.9 |
| 5,756,421 A | | 5/1998 | Choudhary et al. ......... 502/328 |
| 6,293,979 B1 | * | 9/2001 | Choudhary et al. ....... 48/198.7 |
| 6,402,989 B1 | * | 6/2002 | Gaffney ...................... 252/373 |

FOREIGN PATENT DOCUMENTS

| EP | 0303438 A2 | 2/1989 | ............. C01B/3/38 |
|---|---|---|---|
| EP | 0576096 A2 | 12/1993 | ............. C01B/3/38 |
| EP | 0640559 A1 | 3/1995 | ............. C01B/3/38 |
| GB | 2057908 A | 4/1981 | ............. C01B/3/38 |
| GB | 2188251 A | 9/1987 | ............. B01J/37/02 |
| JP | 05103996 | 4/1993 | ............. B01J/37/02 |
| JP | 08089802 | 4/1996 | ............. B01J/23/66 |
| JP | 09131533 | 5/1997 | ............. B01J/23/89 |

OTHER PUBLICATIONS

PCT International Search Report dated Jan. 9, 2002 in PCT/US01/19252.

V. R. Choudhary, et al.; (1997); *Oxidative Conversion of Methane to Syngas over Nickel Supported on Commercial Low Surface Area Porous Catalyst Carriers Precoated with Alkaline and Rare Earth Oxides;* Journal of Catalysis 172: 281–293.

H.Y. Wang and E. Ruckenstein; *Partial Oxidation of Methane to Synthesis Gas over MgO– and $SiO_2$–Supported Rhodium Catalysts;* Journal of Catalysis 186, 181–187 (1999).

Yang–guang Chen, et al.; *Noble Metal Promoted $Ni_{0.03}Mg_{0.97}O$ Solid Solution Catalysts for the Reforming of $CH_4$ with $CO_2$;* Catalysis Letters 39 (1996) 91–95.

Eli Ruckenstin and Yun Hang Hu; *Carbon Dioxide Reforming of Methane Over Nickel/Alkaline Earth Metal Oxide Catalysts;* Applied Catalysis A: General 133 (1995) 149–161.

Eli Ruckenstein and Yun Hang Hu; *Combination of $CO_2$ Reforming and Partial Oxidation of Methan over NiO/MgO Solid Solution Catalysts;* Ind. Eng. Chem. Res. 1998, 37, 1744–1747.

M. Fathi, et al; *Partial Oxidation of Methane to Synthesis Gas at Very Short Contact Times;* Catalysis Today 42 (1998) 205–209.

V.R. Choudary and A.S. Mamman; *Oxidative Conversion of Methane to Syngas Over NiO/MgO Solid Solution Supported on Low Surface Area Catalyst Carrier;* Fuel Processing Technology 60 (1999) 203–211.

Y.H. Hu and E. Ruckenstein; *An Optimum NiO Content in the $CO_2$ Reforming of $CH_4$ with NiO/MgO Solid Solution Catalysts;* Catalysis Letters 36 (1996) 145–149.

D.A. Hickman and L.D. Schmidt; *Synthesis Gas Formation by Direct Oxidation of Methane ove Pt Monoliths;* Journal of Catalysis 138, 267–282 (1992).

* cited by examiner

Primary Examiner—Stanley S. Silverman
Assistant Examiner—Jonas N. Strickland
(74) Attorney, Agent, or Firm—Conley Rose, P.C.

(57) ABSTRACT

Catalysts comprising a catalytically active metal on a NiO—MgO coated porous metal alloy support that are active for catalyzing the oxidative conversion of methane to CO and $H_2$ are disclosed. The preferred catalytically active metal is rhodium and the porous metal alloy support is preferably a perforated fecralloy foil. A method of making the catalysts and coated supports, and processes for using the new catalysts for converting light hydrocarbons, such as methane, to synthesis gas, are disclosed.

11 Claims, No Drawings

SUPPORTED NICKEL-MAGNESIUM OXIDE CATALYSTS AND PROCESSES FOR THE PRODUCTION OF SYNGAS

CROSS-REFERENCE TO RELATED APPLICATIONS

This application claims the benefit under 35 U.S.C. § 119(e) of U.S. Provisional Patent Application No. 60/211,077 filed Jun. 13, 2000.

BACKGROUND OF THE INVENTION

1. Field of the Invention

The present invention generally relates to catalysts and processes for the catalytic partial oxidation of light hydrocarbons (e.g. natural gas) to produce synthesis gas, and more particularly to such catalysts comprising a mixture of nickel oxide and magnesium oxide supported on a porous metal substrate.

2. Description of Related Art

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive.

To improve the economics of natural gas use, much research has focused on methane as a starting material for the production of higher hydrocarbons and hydrocarbon liquids. The conversion of methane to hydrocarbons is typically carried out in two steps. In the first step, methane is reformed with water to produce carbon monoxide and hydrogen (i.e., synthesis gas or syngas). In a second step, the syngas is converted to hydrocarbon waxes and other hydrocarbon products, for example, fuels boiling in the middle distillate range such as kerosene and diesel fuel, by the Fischer-Tropsch process.

Current industrial use of methane as a chemical feedstock typically begins with the conversion of methane to carbon monoxide and hydrogen by either steam reforming, which is the most widespread process, or by dry reforming. Steam reforming currently is the major process used commercially for the conversion of methane to synthesis gas, proceeding according to Equation 1.

$$CH_4 + H_2O \Leftrightarrow CO + 3H_2 \qquad (1)$$

Although steam reforming has been practiced for over five decades, efforts to improve the energy efficiency and reduce the capital investment required for this technology continue.

The use of catalysts to effect the partial oxidation of hydrocarbons, e.g., natural gas or methane to syngas, is also a process known in the art. Although it currently has limited commercial usage, catalytic partial oxidation has recently attracted much attention due to significant inherent advantages, including the fact that significant heat is released during the process, in contrast to steam reforming processes.

In catalytic partial oxidation, natural gas is mixed with air, oxygen-enriched air, or oxygen, and introduced to a catalyst at elevated temperature and pressure. The partial oxidation of methane yields a syngas mixture with a $H_2$:CO ratio of 2:1, as shown in Equation 2.

$$CH_4 + \tfrac{1}{2}O \Leftrightarrow CO + 2H_2 \qquad (2)$$

This ratio is more useful than the $H_2$:CO ratio from steam reforming for conversion of syngas to chemicals such as methanol and to fuels. Furthermore, oxidation reactions are typically much faster than reforming reactions. Thus, much smaller reactors can be used for the partial oxidation reaction than are needed for steam reforming. The syngas in turn may be converted to hydrocarbon products, for example, fuels boiling in the middle distillate range, such as kerosene and diesel fuel, and hydrocarbon waxes by processes such as the Fischer-Tropsch synthesis.

U.S. Pat. No. 5,648,582 discloses a process for the catalytic partial oxidation of a feed gas mixture consisting of essentially methane. The methane-containing gas feed mixture and an oxygen-containing gas are passed over a supported metal catalyst at space velocities of 800,000 hr−1 to 12,000,000 hr−1. The catalytic metals are selected from the group consisting of rhodium, nickel and platinum.

M. Fathi et al., *Catal. Today*, 42, 205–209 (1998) disclose the catalytic partial oxidation of methane over Pt, Pt/Rh, Pt/Ir and Pd gauze catalysts at contact times of 0.21 to 0.33 milliseconds. Pt, Pt/5%Rh and Pt/10%Rh gauzes were tested under the same conditions at 700 to 1100° C. The best results were obtained at 1100° C. using the Pt/10%Rh gauze catalyst. The $CH_4$ conversion was about 30%; the oxygen conversion was about 60%; the CO selectivity was about 95%; and the hydrogen selectivity was about 30%.

European Patent No. 0640559A1 discloses a process for the partial oxidation of natural gas which is carried out by means of a catalyst constituted by one or more compounds of metals from the Platinum Group, which is given the shape of wire meshes, or is deposited on a carrier made from inorganic compounds, in such a way that the level of metal or metals from Platinum Group, as percent by weight, comprise within the range of from 0.1 to 20% of the total weight of catalyst and carrier. The partial oxidation is carried out at temperatures in the range of from 300 to 950° C., at pressures in the range of from 0.5 to 50 atmospheres, and at space velocities comprised in the range of from 20,000 to 1,500,000 h−1. The metal catalysts from the Platinum Group are selected from rhodium, ruthenium and iridium.

European Pat. No. 0576096A2 discloses a process for the catalytic partial oxidation of a hydrocarbon feedstock, which process comprises contacting a feed comprising the hydrocarbon feedstock, an oxygen-containing gas and, optionally, steam at an oxygen-to-carbon molecular ratio in the range of from 0.45 to 0.75, at elevated pressure with a catalyst in a reaction zone under adiabatic conditions. The catalyst comprises a metal selected from Group VIII of the Periodic Table and supported on a carrier and is retained within the reaction zone in a fixed arrangement having a high tortuosity. The process is characterized in that the catalyst comprises a metal selected from ruthenium, rhodium, palladium, osmium, iridium and platinum, and the fixed arrangement of the catalyst is in a form selected from a fixed bed of a particulate catalyst, a metal gauze and a ceramic foam.

The selectivities of catalytic partial oxidation to the desired products, carbon monoxide and hydrogen, are controlled by several factors, but one of the most important of these factors is the choice of catalyst composition. Heretofore, typical catalyst compositions have included precious metals and/or rare earths. The large volumes of expensive catalysts needed by prior art catalytic partial oxidation processes have generally prevented these processes from becoming economically feasible.

For successful operation at commercial scale, the catalytic partial oxidation process must be able to achieve a high conversion of the methane feedstock at high gas hourly space velocities, and the selectivity of the process to the desired products of carbon monoxide and hydrogen must be high. Such high conversion and selectivity must be achieved without detrimental effects to the catalyst, such as the formation of carbon deposits ("coke") on the catalyst, which severely reduces catalyst performance. Accordingly, substantial effort has been devoted in the art to the development of catalysts allowing commercial performance without coke formation.

A number of process regimes have been proposed in the art for the production of syngas via partial oxidation reactions. For example, the process described in U.S. Pat. No. 4,877,550 employs a syngas generation process using a fluidized reaction zone. Such a process however, requires downstream separation equipment to recover entrained supported-nickel catalyst particles.

To overcome the relatively high pressure drop associated with gas flow through a fixed bed of catalyst particles, which can prevent operation at the high gas space velocities required, various structures for supporting the active catalyst in the reaction zone have been proposed. U.S. Pat. No. 5,510,056 discloses a monolithic support such as a ceramic foam or fixed catalyst bed having a specified tortuosity and number of interstitial pores that is said to allow operation at high gas space velocity. The preferred catalysts for use in the process comprise ruthenium, rhodium, palladium, osmium, iridium, and platinum. Data are presented for a ceramic foam supported rhodium catalyst at a rhodium loading of from 0.5–5.0 wt %.

U.S. Pat. No. 5,648,582 also discloses a process for the catalytic partial oxidation of a feed gas mixture consisting essentially of methane. The methane-containing feed gas mixture and an oxygen-containing gas are passed over an alumina foam supported metal catalyst at space velocities of 120,000 hr.$^{-1}$ to 12,000,000 hr.$^{-1}$ The catalytic metals exemplified are rhodium and platinum, at a loading of about 10 wt %.

Catalysts containing Group VIII metals such as nickel on a variety of supports are known in the art. For example, V. R. Choudhary et al. (*J. Catalysis* 172: 281–293 (1997); Fuel Processing Technology 60:203–211 (1999)) disclose the partial oxidation of methane to syngas at contact times of 4.8 ms (at STP) over supported nickel catalysts at 700 and 800° C. Certain catalysts were prepared by depositing NiO—MgO on different commercial low surface area porous catalyst carriers consisting of refractory compounds such as $SiO_2$, $Al_2O_3$, SiC, $ZrO_2$ and $HfO_2$. The catalysts were also prepared by depositing NiO on the catalyst carriers with different alkaline and rare earth oxides such as MgO, CaO, SrO, BaO, $Sm_2O_3$ and $Yb_2O_3$. The beneficial effect of precoating a catalyst support containing Al2O3 and SiO2 with MgO before depositing nickel oxide on the support have been discussed (V. R. Choudhary et al. *Catalysis Letters* 32:387–390 (1995)).

U.S. Pat. No. 5,149,464 discloses a method for selectively converting methane to syngas at 650° C. to 950° C. by contacting the methane/oxygen mixture with a solid catalyst, which is either:

a catalyst of the formula $M_xM'_yO_z$ where:

M is at least one element selected from Mg, B, Al, Ln, Ga, Si, Ti, Zr, Hf and Ln where Ln is at least one member of lanthanum and the lanthanide series of elements;

M' is a d-block transition metal, and each of the ratios x/z and y/z and (x+y)/z is independently from 0.1 to 8; or an oxide of a d-block transition metal; or a d-block transition metal on a refractory support; or a catalyst formed by heating a) or b) under the conditions of the reaction or under non-oxidizing conditions. The d-block transition metals are stated to be selected from those having atomic number 21 to 29, 40 to 47 and 72 to 79, the metals scandium, titanium, vanadium, chromium, manganese, iron, cobalt, nickel, copper, zirconium, niobium, molybdenum, technetium, ruthenium, rhodium, palladium, silver, hafnium, tantalum, tungsten, rhenium, osmium, iridium, platinum and gold. Preferably M' is selected from Fe, Os, Co, Rh, Ir, Pd, Pt and particularly Ni and Ru. The exemplary conversions, selectivities, and gas hourly space velocities are relatively low however, while reaction temperatures are relatively high, and the effects of coke formation are not addressed.

European Patent Application Pub. No. 303,438 describes the production of synthesis gas by catalytic partial oxidation to overcome some of the disadvantages and costs of steam reforming. In that process a monolithic catalyst is used, with or without metal addition to the surface of the monolith, at space velocities of 20,000–500,000 hr$^{-1}$. The suggested metal coatings are Pt, Rh, Ir, Os, Ru, Ni, Cr, Co, Ce, La and mixtures thereof, in addition to metals of the groups IA, IIA, III, IV, VB, VIB, or VIIB of the Periodic Table of the Elements. The exemplary reaction is catalyzed by a monolith of Pt—Pd on an alumina/cordierite support. Certain catalyst disks of dense wire mesh, such as high temperature alloys or platinum mesh are also described. It is suggested that, optionally, the wire mesh may be coated with certain metals or metal oxides having catalytic activity for the oxidation reaction.

U.S. Pat. Nos. 5,756,421 and 5,338,488 describe certain NiO—MgO particulate catalysts for catalyzing the oxidative conversion of methane or natural gas to synthesis gas. One problem with many of the existing metal oxide syngas catalysts is the difficulty of controlling the reaction temperature and the occurrence of "hot spots" in the catalyst bed.

H. Y. Wang and E. Ruckenstein (*J. Catalysis* 186:181–187 (1999); *Applied Catalysis A: General* 133:149–161 (1995); *Catalysis Letters* 36:145–149 (1996); and *Ind. Eng. Chem. Res.* 37:1744–1747 (1998)) describe the partial oxidation of methane over MgO supported Rh, the $CO_2$ reforming of methane over a Ni catalyst supported on MgO, and the coupling of $CO_2$ reforming and partial oxidation of methane over a NiO/MgO solid solution catalyst. It was reported that little sintering of the nickel or rhodium occurred due to the strong interaction of those metals with the MgO support.

Y-G Chen et al. (*Catalysis Letters* 39:91–95 (1996)) describe certain noble metal promoted $Ni_{0.03}Mg_{0.97}O$ solid solution catalysts for $CO_2$ reforming of methane. High temperature reduction is necessary to generate the reduced state Ni to catalyze the reforming of $CH_4$ with $CO_2$.

Although many of the prior art catalysts and processes constitute advancements in the field of synthesis gas generation, there still exists a need for better net catalytic partial oxidation processes and stable catalysts that are capable of high conversion and high selectivity for $H_2$ and CO, without appreciable coking, over extended periods of operation.

SUMMARY OF INVENTION

The present invention overcomes many of the deficiencies of conventional catalysts and processes for producing synthesis gas from light hydrocarbon feedstocks by a primarily partial oxidation reaction. In accordance with one aspect of the invention, a catalyst comprising a NiO—MgO coated porous metal alloy substrate and an active metal catalyst outer layer is provided. The NiO—MgO coating, which itself has catalytic activity, also functions as a diffusion barrier to the supported metal catalyst, thus preventing alloying of the catalyst metal the catalyst support. The new catalysts are better able to resist thermal shock than conventional catalysts and offer a more economic alternative to using large amounts of expensive metal catalysts, such as rhodium. Catalyzing a predominantly partial oxidation reaction, the catalyst compositions of the present invention provide high $CH_4$ conversion levels and high selectivities for CO and $H_2$ products and demonstrate lower run temperatures than is typical for a rhodium catalyst. The close stacking of the coated metal substrates also provides better reaction temperature control due to good thermal integration of the catalyst bed.

In accordance with another aspect of the invention, a process is provided which comprises the catalytic net partial oxidation of a hydrocarbon feedstock by contacting a feed stream comprising a hydrocarbon feedstock and an oxygen-containing gas with a new catalyst, described herein, in a reaction zone maintained at conversion-promoting conditions effective to produce an effluent stream comprising carbon monoxide and hydrogen.

In accordance with another aspect of the invention, a catalyst support comprising a protective layer of NiO—MgO is provided. In certain preferred embodiments the Ni:Mg stoichiometric atomic ratio ranges from about 9:91 to about 91:9. In some of these embodiments the thickness of the NiO—MgO layer coat ranges from about 690 nm to about 4560 nm.

In accordance with still other aspects of the invention, a method of making the new NiO—MgO coated catalyst supports and catalysts are provided. Certain preferred embodiments of these methods provide for applying a coating comprising a mixture of nickel and magnesium to at least one perforated fecralloy foil disk. Each such coated disk is then calcined at about 900° C. for about 4 hrs. in an atmosphere containing oxygen. In some embodiments of the method of making a catalyst, the method also includes treating each of the calcined disks in a hydrogen atmosphere at about 900° C. for about 4 hrs. and then applying a layer of rhodium over the Ni(O)—Mg(O) coated disk.

These and other embodiments, features and advantages of the present invention will become apparent with reference to the following description.

DETAILED DESCRIPTION OF PREFERRED EMBODIMENTS

A feed stream comprising a light hydrocarbon feedstock, such as methane, and an $O_2$-containing gas is contacted with a catalyst bed containing one or more metal supported NiO—MgO catalysts, with or without a promoter layer, prepared substantially as described in one of the foregoing Examples. The supported catalyst units are favorably arranged to make up the catalyst bed in a reaction zone maintained at conversion-promoting conditions effective to produce an effluent stream comprising carbon monoxide and hydrogen. Preferably a millisecond contact time reactor is employed, equipped for either axial or radial flow of reactant and product gases. Several schemes for carrying out catalytic partial oxidation (CPOX) of hydrocarbons in a short or millisecond contact time reactor have been described in the literature. For example, L. D. Schmidt and his colleagues at the University of Minnesota describe a millisecond contact time reactor in U.S. Pat. No. 5,648,582 and in *J. Catalysis* 138, 267–282 (1992) for use in the production of synthesis gas by direct oxidation of methane over a catalyst such as platinum or rhodium. A general description of major considerations involved in operating a reactor using millisecond contact times is given in U.S. Pat. No. 5,654,491. The disclosures of the above-mentioned references are incorporated herein by reference.

The present hydrocarbon conversion process produces synthesis gas ("syngas"), a mixture of carbon monoxide and hydrogen, from gaseous hydrocarbons having a low boiling point. The hydrocarbon feedstock is in the gaseous phase when contacting the catalyst. The process is suitable for the partial oxidation of methane, natural gas, associated gas or other sources of light hydrocarbons having 1 to 5 carbon atoms. Natural gas is mostly methane, but it can also contain up to about 15 mole % ethane, propane and butane. The process may be used for the conversion of gas from naturally occurring reserves of methane which can also contain carbon dioxide, nitrogen and hydrogen sulfide. Preferably, the feed comprises at least 50% by volume methane, more preferably at least 75% by volume, and most preferably at least 80% by volume.

Before the hydrocarbon feedstock gas contacts the catalyst, it is mixed with an oxygen ($O_2$)-containing gas, which is preferably pure oxygen. The methane-containing feed gas and the oxygen-containing gas are preferably mixed in such amounts to give a ratio of carbon to oxygen in the range of from about 1.25:1 to about 3.3:1, more preferably from about 1.3:1 to about 2.3:1, and most preferably from about 1.5:1 to about 2.2:1. Preferably, an autothermal net partial oxidation reaction ensues, and the reaction conditions are maintained to promote continuation of the autothermal process. The term "autothermal" means that after catalyst ignition, no additional or external heat must be supplied to the catalyst in order for the production of synthesis gas to continue. The process is conducted under autothermal reaction conditions wherein the feed is partially oxidized and the heat produced by that exothermic reaction drives the continued reaction. Consequently, under autothermal process conditions there is no external heat source required. Autothermal reaction conditions are promoted by optimizing the concentrations of hydrocarbon and $O_2$ in the reactant gas mixture, preferably within the range of about a 1.5:1 to about 2.3:1 ratio of carbon:oxygen. The hydrocarbon:oxygen ratio is an important variable for maintaining the autothermal reaction and the desired product selectivities. Pressure, residence time, amount of feed preheat and amount of nitrogen dilution, if used, also affect the reaction products. The process is operated at atmospheric or superatmospheric pressures, with the latter being preferred. The process is preferably operated at pressures of from about 110 kPa to about 3,000 kPa, and more preferably at pressures of from about 500 kPa to about 2,000 kPa. The process is operated at temperatures between about 600° C. and about 1300° C., and more preferably between about 800° C. and about 1100° C. The hydrocarbon feedstock and the oxygen-containing gas are preferably pre-heated to a temperature between about 50° C. and about 700° C., more preferably between about 300° C. and about 500° C. The preferred conversion-promoting conditions also include maintaining a catalyst residence time of no more than about 10 milliseconds for the reactant gas mixture. This is accomplished by passing the reactant gas mixture over, the catalyst at high space velocity. Preferred velocities for the process, stated as normal liters of gas per kilogram of catalyst per hour, are from about 60,000 to about 20,000,000 NL/kg/h. The conversion-promoting conditions of reaction zone temperature, reactant gas composition, space velocity and pressure are maintained, effective to produce an effluent stream comprising carbon monoxide and hydrogen. The product gas mixture emerging from the reactor is harvested and may be sampled for analysis of products, including $CH_4$, $O_2$, CO, $H_2$ and $CO_2$. If desired, the syngas product may be routed directly into a variety of applications. One such preferred application is for producing higher molecular weight hydrocarbon components using Fisher-Tropsch technology.

Although not wishing to be bound by any particular theory, the inventors are of the opinion that the primary reaction catalyzed by the preferred catalysts described herein is the partial oxidation reaction of Equation 2, described above in the background of the invention with respect to a pure methane feed. Other chemical reactions may also occur to a lesser extent, catalyzed by the same catalyst composition, to yield a net partial oxidation reaction. For example, in the course of syngas generation, intermediates such as $CO_2+H_2O$ may occur to a lesser extent as a result of the oxidation of methane, followed by a reforming step to produce CO and $H_2$. Also, particularly in the presence of carbon dioxide-containing feedstock or $CO_2$ intermediate, the reaction

$$CH_4+CO_2 \rightarrow 2CO+2H_2 \qquad (3)$$

may also occur during the production of syngas. Accordingly, the term "catalytic partial oxidation" when used in the context of the present syngas production method, in addition to its usual meaning, can also refer to a net catalytic partial oxidation process, in which a light hydrocarbon, such as methane, and $O_2$ are supplied as reactants and the resulting product stream is predominantly the partial oxidation products CO and $H_2$, in a molar ratio of approximately 2:1, when methane is the hydrocarbon, rather than the complete oxidation products $CO_2$ and $H_2O$.

Catalysts

The catalyst used in the process comprises a mixture of nickel oxide and magnesium oxide supported on, or coating a metal substrate. A promoter metal, such as rhodium, may be included as an outer layer over the NiO—MgO coat. Although rhodium is preferred, other catalytically active metals such as nickel, cobalt, aluminum, and combinations thereof are expected to also serve as satisfactory catalyst outer layers. The metal substrate, or support, is preferably porous, and more preferably is a perforated foil with a thickness of from about 50 micrometers up to about 5,000 micrometers. Any of a wide variety of grid geometries can be used to define the center locations of the perforations. The perforations themselves can also have any geometrical shape (e.g., round, square). The maximum percent of the total area of the foil taken up by the perforations is determined by the residual mechanical strength of the foil and the minimum bearing surface area required to support the catalyst coating.

Alternatively, the support can be a metal foam, a wire mesh, a gauze or any other product form that is suitable for low pressure drop operation. A suitable alternate support would have mechanical strength and bearing surface area characteristics similar to those of the above-described perforated foils.

Reactants containing nickel and magnesium are applied to the support by vapor deposition, impregnation, washcoating, adsorption, ion exchange, precipitation, co-precipitation, deposition precipitation, sol-gel method, slurry dip-coating, microwave heating, and the like, or any other suitable method applying a uniform, thin coating on the metal substrate. Such techniques are well known in the art and have been described in the literature. In a preferred vapor deposition method the support is contacted with vapors of nickel, magnesium and, optionally, one or more promoters. The vapor-deposited support is then calcined. Calcination reaction products that could potentially form at the support/coating interface are not likely to detrimentally interact with the formed NiO—MgO compound.

It is preferred that the Ni and the Mg are applied together in a combined layer and a promoter metal is then applied as a thin overlayer. A plurality of these coated substrates are then stacked together to form a catalyst bed for use in a short contact time syngas production reactor, as described in the section entitled "Test Procedure." Preferably about 5 to about 100 pieces, or layers, are stacked together. Layer-to-layer rotational orientation can be random, or the individual coated supports can be stacked in a defined pattern to be within a given angular range. For example, for a square grid symmetry, an angular alignment of 20 degrees is preferred. For a hexagonal grid symmetry, an angular alignment of 25 degrees is preferred. A number of other suitable angular alignments are possible, provided that they are non-commensurate with the rotation symmetry of the pattern. The fundamental aim being the minimization of channeling, or preferential alignment, across several layers; or, from a complementary perspective, the maximization of tortuosity of the catalyst bed. The preferred metal supports, which are employed in the following examples, are MCrAlY alloys, in the form of perforated foils, where M is Fe or Co or Ni. Preferably, M is Fe. FeCrAlY alloys are commercially available in thin sheets from well known suppliers.

Ceramic foam monoliths are preferably placed upstream and downstream of the catalyst bed and serve as radiation shields. The upstream radiation shield also aids in uniform distribution of the feed gases. A plurality of additional perforated foil supports is preferably provided upstream of the catalyst to further aid in uniform distribution of the feed gas. These perforated foil layers do not include catalyst on their surfaces and may have the same perforation design and the layer-to-layer rotational orientation as the catalyst bed.

Catalyst beds were fabricated by layering a number of identically prepared perforated metal foils coated with compositions comprising mixtures of nickel oxide and magnesium oxide. The perforated metal foil supports are defined by the mesh grid pattern used to locate the centers of the perforations, the shape and approximate dimensions of the perforations (or, equivalently, the approximate fractional open cross-sectional area), the foil thickness, the metallurgical composition of the foil and the temperature and time used to calcine the metal prior to deposition of the formulations containing Ni and Mg. Coating compositions consisting of mixtures comprising nickel oxide and magnesium oxide are generated via sequential high temperature treatments, in air and in hydrogen-containing atmospheres, of vapor deposited metallic coatings defined by their Ni:Mg atomic ratio and their thickness. A subsequent metallic overlayer can also be deposited. In each of the following Examples, the metal foil substrate was a steel alloy having the composition 21% Cr, 5% Al, 0.3% Y, 0.2% Si, balance Fe ("fecralloy"), which had been calcined at 1100° C. for 50 hours, 0.05 mm thick, having square perforations measuring approximately 0.42×0.42 $mm^2$, located on a square 60-mesh grid pattern. In assembling the catalyst bed, a group of such disks were stacked in a random manner without attempting to align the perforation pattern from disk to disk.

EXAMPLES

Example 1

91:9 NiO—MgO on Fecralloy Foil

Perforated fecralloy foil disks were placed on the substrate holder of a conventional vapor deposition reactor.

Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in rotary motion at 10 rpm. The magnetron sputter vaporization sources for nickel and magnesium were then turned on with a power ratio and duration required to yield a metallic coating having a Ni:Mg atomic stoichiometric ratio of 91:9 and a thickness of 4560 nm. The metallized disks were then calcined in air at 900° C. for 4 hours and then treated in a hydrogen atmosphere at 900° C. for 4 hours.

Example 2

9:91 NiO—MgO on Fecralloy Foil

Perforated fecralloy foil disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in rotary motion at 10 rpm. The magnetron sputter vaporization sources for nickel and magnesium were then turned on at a DC power ratio and duration required to yield a metallic coating having a Ni:Mg atomic stoichiometric ratio of 9:91 and a thickness of 690 nm. The metallized disks were then calcined in air at 900° C. for 4 hours and then treated in a hydrogen atmosphere at 900° C. for 4 hours. Subsequently, the disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in motion at 10 rpm. The magnetron sputter vaporization source for rhodium was then turned on at a DC power level and duration required to yield an overcoating having a thickness of 41 nm.

The calcining step comprises heating in air or oxygen at 800° C. to 1000° C., preferably 900° C., for a period of time ranging from about 2–6 hours, preferably 4 hours. The calcining conditions are chosen such that a thin, tightly adhering mixed layer of nickel oxide and magnesium oxide (NiO—MgO) is formed. This layer protects the underlying support alloy from oxidation during high temperature use. The NiO—MgO coating, which itself is catalytic active (as shown in Table 2), also functions as a diffusion barrier to the supported metal catalyst, which is preferably rhodium, thus preventing alloying of the catalyst metal with the alloy of the catalyst support.

Example 3

143 nm Rhodium/9:91 NiO—MgO on Fecralloy Foil

Perforated fecralloy foil disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in rotary motion at 10 rpm. The magnetron sputter vaporization sources for nickel and magnesium were then turned on at a DC power ratio and duration required to yield a metallic coating having a Ni:Mg atomic stoichiometric ratio of 9:91 and a thickness of 690 nm. The metallized disks were then calcined in air at 900° C. for 4 hours and then treated in a hydrogen atmosphere at 900° C. for 4 hours. Subsequently, the disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in motion at 10 rpm. The magnetron sputter vaporization source for rhodium was then turned on at a DC power level and duration required to yield an overcoating having a thickness of 143 nm.

Example 4

361 nM Rhodium/9:91 NiO—MgO on Fecralloy Foil

Perforated fecralloy foil disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in rotary motion at 10 rpm. The magnetron sputter vaporization sources for nickel and magnesium were then turned on at a DC power ratio and duration required to yield a metallic coating having a Ni:Mg atomic stoichiometric ratio of 9:91 and a thickness of 690 nm. The metallized disks were then calcined in air at 900° C. for 4 hours and then treated in a hydrogen atmosphere at 900° C. for 4 hours. Subsequently, the disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in motion at 10 rpm. The magnetron sputter vaporization source for rhodium was then turned on at a DC power level and duration required to yield an overcoating having a thickness of 361 nm.

Example 5

143 nM Rh/12:88 NiO—MgO on Fecralloy Foil

Perforated fecralloy foil disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in rotary motion at 10 rpm. The magnetron sputter vaporization sources for nickel and magnesium were then turned on at a DC power ratio and duration required to yield a metallic coating having a Ni:Mg atomic stoichiometric ratio of 12:88 and a thickness of 4330 nm. The metallized disks were then calcined in air at 900° C. for 4 hours and then treated in a hydrogen atmosphere at 900° C. for 4 hours. Subsequently, the disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in motion at 10 rpm. The magnetron sputter vaporization source for rhodium was then turned on at a DC power level and duration required to yield an overcoating having a thickness of 41 nm.

Example 6

41 nM Rh/12:88 NiO—MgO on Fecralloy Foil

Perforated fecralloy foil disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in rotary motion at 10 rpm. The magnetron sputter vaporization sources for nickel and magnesium were then turned on at a DC power ratio and duration required to yield a metallic coating having a Ni:Mg atomic stoichiometric ratio of 12:88 and a thickness of 4330 nm. The metallized disks were then calcined in air at 900° C. for 4 hours and then treated in a hydrogen atmosphere at 900° C. for 4 hours. Subsequently, the disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in motion at 10 rpm. The magnetron sputter vaporization source for rhodium was then turned on at a DC power level and duration required to yield an overcoating having a thickness of 143 nm.

Example 7

361 nM Rh/12:88 NiO—MgO on Fecralloy Foil

Perforated fecralloy foil disks were placed on the substrate holder of a conventional vapor deposition reactor. Following a pumpdown to a pressure in the low 10–6 torr range, the reactor was filled with flowing argon to a pressure of 10 mtorr, and the substrate holder was rf glow ignited at 100 watts for 15 minutes. The rf glow discharge was then turned off and the substrate holder was set in rotary motion at 10 rpm. The magnetron sputter vaporization sources for nickel and magnesium were then turned on at a DC power ratio and duration required to yield a metallic coating having a Ni:Mg atomic stoichiometric ratio of 12:88 and a thickness of 4330 nm. The metallized disks were then calcined in air at 900° C. for 4 hours and then treated in a hydrogen atmosphere at 900° C. for 4 hours. Subsequently, the disks were placed on the substrate holder of a conventional vapor deposition reactor. Following a pumpdown to a pressure in the low $10^{-6}$ torr range, the reactor was filled with flowing argon to a pressure of 10 mtorr, and the substrate holder was rf glow ignited at 100 watts for 15 minutes. The rf glow discharge was then turned off and the substrate holder was set in motion at 10 rpm. The magnetron sputter vaporization source for rhodium was then turned on at a DC power level and duration required to yield an overcoating having a thickness of 361 nm.

The representative catalyst compositions of Examples 1–7 are summarized in Table 1.

TABLE 1

| EXAMPLE | Ni:Mg Atomic Ratio | First Coating Thickness (nm) | Air Treatment (° C./hrs) | $H_2$ Treatment (° C./hrs) | Composition | Overcoating Thickness (nm) |
|---|---|---|---|---|---|---|
| 1 | 91:9 | 4560 | 900/4 | 900/4 | None | N/A |
| 2 | 9:91 | 690 | 900/4 | None | Rh | 41 |
| 3 | 9:91 | 690 | 900/4 | None | Rh | 143 |
| 4 | 9:91 | 690 | 900/4 | None | Rh | 361 |
| 5 | 12:88 | 4330 | 900/4 | None | Rh | 41 |
| 6 | 12:88 | 4330 | 900/4 | None | Rh | 143 |
| 7 | 12:88 | 4330 | 900/4 | None | Rh | 361 |

Test Procedure

Representative catalysts prepared according the foregoing Examples were tested for their catalytic activity and physical durability in a reduced scale conventional flow apparatus using a 19 mm O.D×13 mm I.D and 305 mm (12") long quartz reactor suitable for running hydrocarbon partial oxidation reactions. Ceramic foam blocks comprising 99% alumina (12 mm O.D.×5 mm of 45 ppi) were placed before and after the catalyst as radiation shields. An Inconel® (nickel alloy sheathed, single point K-type (Chromel/Alumel)) thermocouple ("TC") was placed axially inside the reactor touching the top (inlet) face of the radiation shield. A high temperature S-type (Pt/Pt 10% Rh) bare wire TC was positioned axially touching the bottom face of the catalyst and was used to indicate the reaction temperature. The catalyst and the two radiation shields were sealed against the walls of the quartz reactor by wrapping their sides with a high purity (99.5%) alumina paper. A 600 watt band heater set at 90% electrical output was placed around the quartz tube and provided heat to light off the reaction and preheat the feed gases. The bottom of the band heater corresponded to the top of the upper radiation shield.

In addition to the TC's placed above and below the catalyst, the reactor also contained two axially positioned, triple-point TC's, one before and another after the catalyst. These triple-point thermocouples were used to determine the temperature profiles of reactants and products subjected to preheating and quenching, respectively.

All runs were done at a $CH_4:O_2$ molar ratio of 2:1, the reactant gas feed comprised 60% $CH_4$, 30% $O_2$, 10% $N_2$, unless otherwise indicated, with a combined flow rate up to 7.7 SLPM (431,720 GHSV) and operating at a pressure of 5 psig (136 kPa) or more. The reactor effluent was analyzed using a gas chromatograph equipped with a thermal conductivity detector. The C, H and O mass balances were all between 98% and 102%.

The results obtained from testing the catalyst compositions of Examples 1–7, as described under "Test Procedure" are shown in Table 2.

TABLE 2

| Example No. | No. Layers | Total Flow (SLPM) | Preheat °C. | Reactor °C. | % CH₄ Conv. | % O₂ Conv. | % CO Sel. | % H₂ Sel. |
|---|---|---|---|---|---|---|---|---|
| 1 | 19 | 2.5 | 736 | 873 | 92 | 100 | 98 | 98 |
|   | 19 | 5.0 | 691 | 889 | 93 | 100 | 98 | 98 |
|   | 19 | 7.5 | 447 | 886 | 88 | 100 | 97 | 95 |
| 2 | 19 | 2.5 | 570 | 1070 | 69 | 100 | 91 | 94 |
| 3 | 19 | 2.5 | 520 | 1037 | 82 | 100 | 95 | 93 |
| 4 | 19 | 2.5 | 470 | 950 | 84 | 100 | 96 | 94 |
|   | 19 | 7.5 | 200 | 1070 | 81 | 100 | 95 | 90 |
| 5 | 19 | 2.5 | 480 | 850 | 87 | 100 | 96 | 97 |
| 6 | 19 | 2.5 | 500 | 790 | 89 | 100 | 96 | 98 |
|   | 19 | 6.2 | 135 | 1040 | 68 | 100 | 91 | 87 |
| 7 | 19 | 2.5 | 540 | 1070 | 90 | 100 | 97 | 97 |
|   | 19 | 7.5 | 255 | 920 | 75 | 100 | 95 | 88 |

Feed: 62% $CH_4$, 30% $O_2$, 8% $N_2$

As shown in Table 2, the run performance of the representative catalysts improved as the Ni:Mg atomic ratio, the thickness of the NiO—MgO coating and the thickness of the rhodium overcoating all increased. These catalysts also provide thermal shock resistance and minimize the use of expensive rhodium metal, and processes employing the catalysts operate at temperatures below that which is typical using conventional rhodium catalysts. A catalyst bed comprised of a stack of the above-described coated metal substrates also provides better thermal integration than typical partial oxidation catalysts beds. The term "thermal integration" refers to stable catalyst structures and supports with favorable heat conduction properties that facilitate heat balancing between the exothermic and endothermic reactions that may take place in different areas of the catalyst bed, when a catalyst is employed on-stream in a syngas production reactor.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims. The disclosure of U.S. Provisional Patent Application No. 60/211,077 filed Jun. 13, 2000 is hereby incorporated herein by reference. All patents, patent applications and publications cited herein are hereby incorporated herein by reference.

What is claimed is:

1. A process for the catalytic partial oxidation of a hydrocarbon feedstock comprising:

mixing together a hydrocarbon feedstock and an $O_2$-containing gas to provide a reactant gas mixture;

contacting a stream of said reactant gas mixture with a catalyst in a reaction zone maintained at catalytic partial oxidation-promoting conditions effective to produce an effluent stream comprising carbon monoxide and hydrogen, said catalyst comprising a mixture of nickel oxide and magnesium oxide supported on a metal substrate wherein said catalyst comprises a NiO—MgO layer about 690–4560 nm thick on said substrate and wherein said catalyst comprises a rhodium layer about 41–361 nm thick on said layer of nickel oxide and magnesium oxide.

2. The process of claim 1 wherein the hydrocarbon feedstock comprises at least 80% by volume methane.

3. The process of claim 2 wherein the methane to oxygen ratio is from about 1.5:1 to about 2.2:1.

4. The process of claim 1 wherein the reaction pressure is from about 500 kPa to about 2,800 kPa.

5. The process of claim 1 wherein said hydrocarbon feedstock and said oxygen-containing gas are pre-heated to about 300° C. before contact with the catalyst.

6. The process of claim 1 wherein said hydrocarbon feedstock and said oxygen-containing gas are passed over the catalyst at space velocities of from about 150,000 to about 10,000,000 NL/kg/h.

7. The process of claim 1 wherein said substrate comprises a Fe, Cr, Al, Y alloy.

8. The process of claim 1 wherein said substrate is about 50–5000 microns thick.

9. The process of claim 1 wherein said substrate is a perforated metal foil.

10. The process of claim 1 wherein said catalyst comprises a Ni:Mg atomic stoichiometric ratio of about 9:91 to 91:9.

11. The process of claim 10 wherein said catalyst comprises a Ni:Mg atomic stoichiometric ratio of about 12:88.

\* \* \* \* \*